(12) United States Patent
Quintero

(10) Patent No.: US 9,986,016 B2
(45) Date of Patent: May 29, 2018

(54) DOWNLOAD MANAGER INTEGRATION WITH A CLOUD STORAGE PLATFORM

(71) Applicant: Microsoft Technology Licensing, LLC, Redmond, WA (US)

(72) Inventor: Megan M. Quintero, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

(21) Appl. No.: 14/626,722

(22) Filed: Feb. 19, 2015

(65) Prior Publication Data
US 2016/0248839 A1   Aug. 25, 2016

(51) Int. Cl.
*H04L 29/08* (2006.01)

(52) U.S. Cl.
CPC .......... *H04L 67/06* (2013.01); *H04L 67/1095* (2013.01); *H04L 67/1097* (2013.01); *H04L 67/02* (2013.01)

(58) Field of Classification Search
CPC ....................................................... H04L 67/02
See application file for complete search history.

(56) References Cited

U.S. PATENT DOCUMENTS

| | | | |
|---|---|---|---|
| 6,029,200 A * | 2/2000 | Beckerman | H04L 29/06 709/226 |
| 6,917,923 B1 * | 7/2005 | Dimenstein | G06F 21/10 380/44 |
| 7,862,480 B2 | 1/2011 | Sudeith et al. | |
| 8,639,781 B1 * | 1/2014 | Motes | H04L 67/02 455/414.1 |
| 2012/0191657 A1 * | 7/2012 | Weinstein | H04L 67/1095 707/654 |
| 2012/0311280 A1 | 12/2012 | Schmidt et al. | |
| 2013/0174050 A1 * | 7/2013 | Heinonen | H04L 67/32 715/748 |
| 2013/0219069 A1 | 8/2013 | Yellapragada | |
| 2014/0068019 A1 | 3/2014 | Sheth et al. | |
| 2014/0108508 A1 * | 4/2014 | Liu | H04L 67/104 709/203 |
| 2014/0142984 A1 | 5/2014 | Wright et al. | |

(Continued)

FOREIGN PATENT DOCUMENTS

CN              103699597              4/2014

OTHER PUBLICATIONS

"Egnyte Replaces Traditional File Servers", Retrieved From: <Egnyte Replaces Traditional File Servers> Jan. 21, 2015, Feb. 8, 2014, 4 pages.

(Continued)

*Primary Examiner* — Lashonda Jacobs

(57) ABSTRACT

Download manager integration with a cloud storage platform is described. In one or more implementations, a web page is navigated to using a web platform. User input to the web page to download content referenced in the web page is detected. For example, the web page may include a download link that is selected by the user to download content such as a media file, word processing file, and so forth. In response to detecting the user input to download the content, a download manager automatically, and without any additional user input, initiates a download of the content to a cloud storage database that is remote from the computing device.

20 Claims, 6 Drawing Sheets

(56) References Cited

U.S. PATENT DOCUMENTS

| | | | |
|---|---|---|---|
| 2015/0172416 A1* | 6/2015 | Morancy | H04L 67/1097 709/219 |
| 2015/0193465 A1* | 7/2015 | Schoeffler | G06F 17/30194 707/827 |
| 2015/0304412 A1* | 10/2015 | Xiong | H04L 67/06 709/219 |
| 2015/0334182 A1* | 11/2015 | Wu | H04L 67/1095 707/620 |
| 2015/0365477 A1* | 12/2015 | Ramachandra Panicker | H04L 67/1095 709/217 |
| 2016/0034539 A1* | 2/2016 | Yoon | G06F 17/30528 707/769 |
| 2016/0036897 A1* | 2/2016 | Kim | G06F 17/30194 709/219 |

OTHER PUBLICATIONS

"MultCloud—Cloud File Manager for Merging Cloud Drives", Retrieved From: <https://www.multcloud.com/product> Jan. 21, 2015, Jul. 1, 2014, 3 pages.

"Unifyle: Search, Manage, Share and Edit enterprise Files Everywhere, Securely using Any Device", Available at: <https://www.unifyle.co/doc/unifylesummary.pdf>, 2014, 2 pages.

Brinkmann, "Backup Box: Move Cloud Hosted Files Directly Between Providers and Servers", Retrieved From: <http://www.ghacks.net/2012/08/29/backup-box-move-cloud-hosted-files-directly-between-providers-and-servers/> Jan. 21, 2015, Aug. 29, 2012, 9 pages.

Hutchins, "Download Directly to Google Drive", Retrieved From: <http://forums.androidcentral.com/android-apps/169423-download-directly-google-drive.html> Jan. 21, 2015, Apr. 24, 2012, 16 pages.

Saxena, "UC Browser Now Allows iOS Users to Download and Store Files in the Cloud", Retrieved From: <http://gadgets.ndtv.com/mobiles/news/uc-browser-now-allows-ios-users-to-download-and-store-files-in-the-cloud-321230> Jan. 21, 2015, Jan. 23, 2013, 2 pages.

Timmer, "Synology Offers a Dropbox Substitute—Meet the Personal Cloud", Retrieved From: <http://arstechnica.com/gadgets/2014/04/synology-offers-a-dropbox-substitute-meet-the-personal-cloud/> Jan. 21, 2015, Apr. 2, 2014, 6 pages.

* cited by examiner

DOWNLOAD MANAGER INTEGRATION WITH A CLOUD STORAGE PLATFORM

BACKGROUND

Web pages often contain links that can be selected by a user to download content (e.g., media files or word processing files) to the user's device. Some computing devices, such as wireless phones, may have limited storage for storing the content. Thus, the download of content may negatively impact the amount of storage space remaining on a computing device, especially when the size of the content is large. Further, in some cases users may not have the appropriate application needed to open a particular file type and thus may want to open the file on a different device that includes an application that is capable of opening the file.

SUMMARY

Download manager integration with a cloud storage platform is described. In one or more implementations, a web page is navigated to using a web platform (e.g., a web browser). User input to the web page to download content referenced in the web page is detected. For example, the web page may include a download link that is selected by the user to download content such as a media file, word processing file, and so forth.

In response to detecting the user input to download the content, a download manager automatically, and without any additional user input, software, plug-ins, or configuration, initiates a download of the content to a cloud storage database that is remote from the computing device. In one or more implementations, the download manager initiates the download by communicating a request to download the content to a cloud storage manager. The cloud storage manager then facilitates the download of the content from a web server that stores the content to the cloud storage database that is remote from the computing device. The content is download directly to the cloud storage database without storing the content locally on the computing device.

BRIEF DESCRIPTION OF THE DRAWINGS

The detailed description is described with reference to the accompanying figures. The same numbers are used throughout the drawings to reference like features and components.

DETAILED DESCRIPTION

Overview

Figure 1:
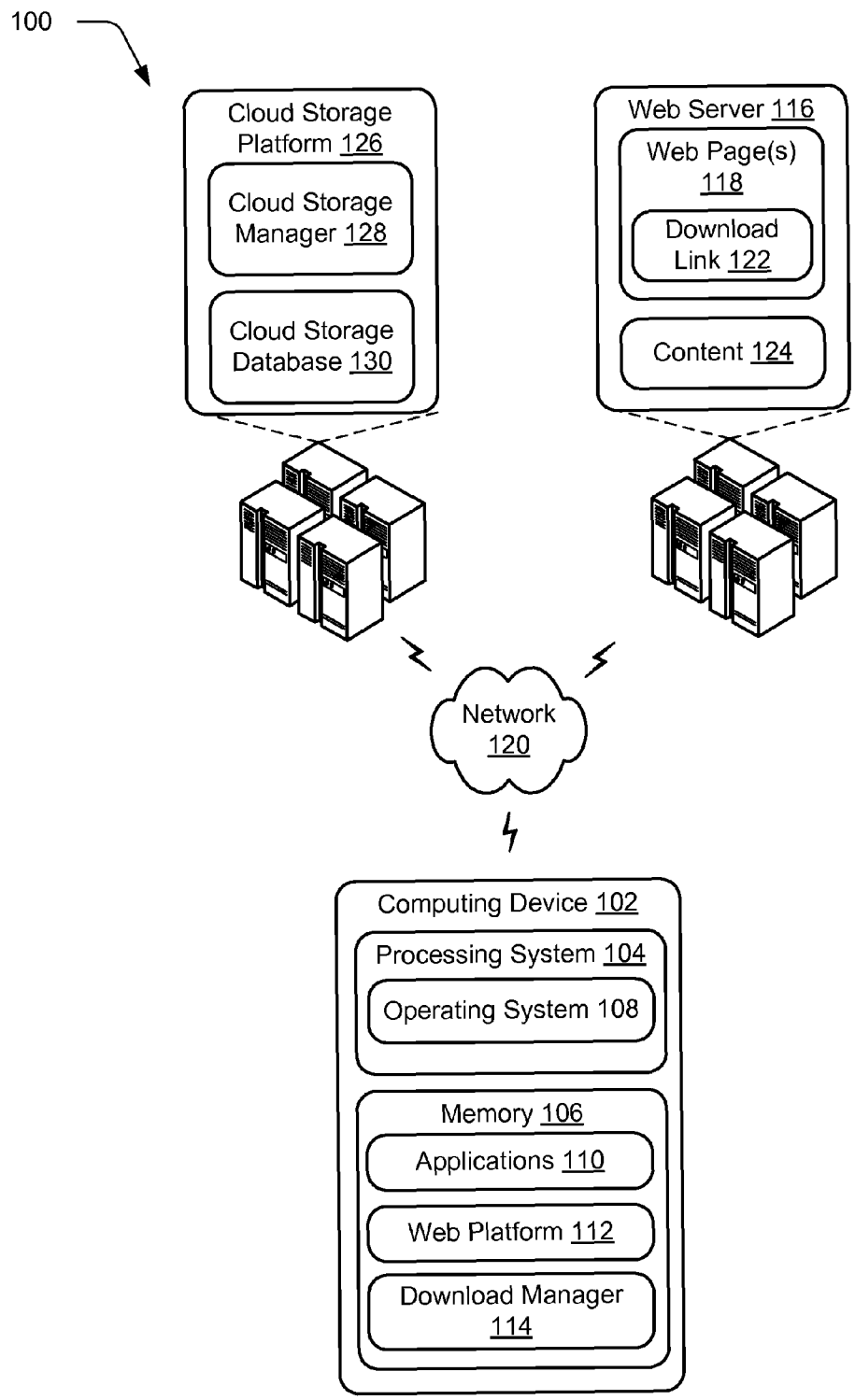
FIG. 1 is an illustration of an environment in an example implementation that is operable to support techniques described herein.

Download manager integration with a cloud storage platform is described. In one or more implementations, a web page is navigated to using a web platform (e.g., a web browser). User input to the web page to download content referenced in the web page is detected. For example, the web page may include a download link that is selected by the user to download content, such as a media file, a word processing file, and so forth. When the download link is selected, a navigation is first detected, and the navigation is detected to lead to the download of the content.

In response to detecting the user input to download the content, a download manager automatically, and without any additional user input, initiates a download of the content to a cloud storage database that is remote from the computing device. In one or more implementations, the download manager initiates the download by communicating a request to download the content to a cloud storage manager. The cloud storage manager then facilitates the download of the content from a web server that stores the content to the cloud storage database that is remote from the computing device. The content is download directly to the cloud storage database without storing the content locally on the computing device.

Storing the content in the cloud storage database is faster than downloading the content to the computing device, and saves resources of the computing device. For example, storage on the computing device is not affected by the download because the content is stored remote from the computing device. Similarly, the computing device may use a relatively small amount of processing resources to download the content because the cloud storage manager which facilitates the download may be implemented remote from the computing device.

Additionally, the download of the content may be substantially faster than downloading the content to a file system of the current computing device because the content is transferred "server-to-server". Transferring the content server-to-server also eliminates the need to first download the content to the file system of the current computing device, and then transfer the data to the cloud storage database. Notably, this feature may be convenient for users with limited data plans because the content is downloaded directly to the cloud storage database without the need to first download the content to the computing device, and then also upload the content to the cloud storage database.

A variety of other benefits are achieved by the described techniques. For example, by saving the content to the cloud storage database, the content can later be accessed by the user using other computing devices that are registered or associated with the cloud storage database. For example, the user could initiate the download of an e-book or large document from the user's wireless phone, and later access this content from the user's laptop or tablet device. Furthermore, downloading the content directly to the cloud storage database increases the security and safety of the download by eliminating the possibility of downloading harmful content, such as malware or viruses, to the file system of the current computing device.

Further, because the download is controlled by the download manager, the download is governed by all of the security measures typically associated with a download manager. For example, all of the appropriate application reputation scans would still be performed by the download manager, which makes the user much less vulnerable. Thus, the user benefits from all of the power associated with the download manager without downloading the content to the memory system of the computing device.

Example Environment

FIG. 1 is an illustration of an environment 100 in an example implementation that is operable to support techniques described herein. The illustrated environment 100 includes a computing device 102 having one or more hardware components, examples of which include a processing system 104 and a computer-readable storage medium that is illustrated as a memory 106 although other components are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, and so forth. Thus, the computing device 102 may range from full resource devices with substantial memory and processor resources (e.g., personal computers, game consoles) to a low-resource device with limited memory, storage, and/or processing resources (e.g., traditional set-top boxes, hand-held game consoles, wireless phones). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on. In addition, it may apply to apparatuses including a plurality of display devices.

The computing device 102 is further illustrated as including an operating system 108, although other embodiments are also contemplated in which an operating system is not employed. The operating system 108 is configured to abstract underlying functionality of the computing device 102 to applications 110 that are executable on the computing device 102. For example, the operating system 108 may abstract the processing system 104, memory 106, and/or network functionality of the computing device 102 such that the applications 110 may be written without knowing "how" this underlying functionality is implemented. The application 110, for instance, may provide data to the operating system 108 to be rendered and displayed by a display module without understanding how this rendering will be performed. The operating system 108 may also represent a variety of other functionality, such as to manage a file system and user interface that is navigable by a user of the computing device 102.

Computing device 102 also includes a web platform 112. Web platform 112 works in connection with content of the web, e.g. public content such as websites and the like. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers, local applications such as a Windows® Store application, and the like. In the examples described below, a web platform in the form of a web browser that navigates to various websites is utilized. It is to be appreciated and understood, however, that the inventive principles can be employed by web platforms other than web browsers.

Computing device 102 is illustrated as including a download manager 114 that can be stored on computer-readable storage memory (e.g., memory 106), such as any suitable memory device or electronic data storage implemented by the device. Generally, download manager 114 is configured to facilitate the download of content to computing device 102. In some implementations, download manager 114 is a component of web platform 112. For example, download manager 114 can be implemented as a component of a web browser. Alternately, download manager 114 can be implemented as a component of operating system 108.

Environment 100 is further illustrated as including a web server 116 that hosts various web pages 118 that can be navigated to by computing device 102 using web platform 112 over a communication network 120. Some of web pages 118 may include a download link 122 to content 124. As described herein, content 124 can include any type of content, such as media content (e.g., audio files, video files, image files), word processing files (e.g., Microsoft® Word documents), spreadsheet files (e.g., Microsoft® Excel documents), and so forth. Download link 122 may reference a web address (e.g., URL) of content 124 that is selectable to download content 124. In some cases, content 124 is stored or hosted at web server 116 along with the web page 118. Alternately, content 124 may be stored at a web server 116 that is different than the web server 116 at which the web page 118 is hosted.

Environment 100 is further implemented as including a cloud storage platform 126. Cloud storage platform 126 is located remote from computing device 102, and can be accessed by computing device 102 over communication network 120. Cloud storage platform 126 may be implemented as any type of cloud storage platform or database, such as OneDrive® by Microsoft® Corporation, iCloud® by Apple®, Dropbox® storage, and the like.

Cloud storage platform 126 is illustrated as including a cloud storage manager 128 that is configured to facilitate download and storage of content 124 to a cloud storage database 130. Cloud storage database 130 may include storage that is associated with computing device 102 and/or the user of computing device 102. For example, the user may be able to register or associate one or more computing devices 102 with cloud storage database 130. In this way, content 124 that is initiated from download from any of the user's computing devices may be accessed by any of the computing devices of the user that are registered or associated with cloud storage database 130. While cloud storage manager 128 is described as being implemented remote from computing device 102, in one or more implementations components of cloud storage manager 128 may be implemented at computing device 102.

In accordance with various implementations, download manager 114 is configured to perform one or more techniques to initiate the download of content 124 from web server 116 to cloud storage database 130 based on user interaction with a web page. In one or more implementations, download manager 114 initiates the download automatically and responsive to user input to download content 124 to computing device 102. For example, download manager 114 may automatically initiate the download of content 124 to cloud storage database 130 in response to user selection of download link 122 contained within web page 118.

To initiate the download of content 124, download manager 114 communicates a request, to download content 124, to cloud storage manager 128. Responsive to receiving the request, cloud storage manager 128 downloads content 124 from web server 116 directly to cloud storage database 130.

Figure 6:
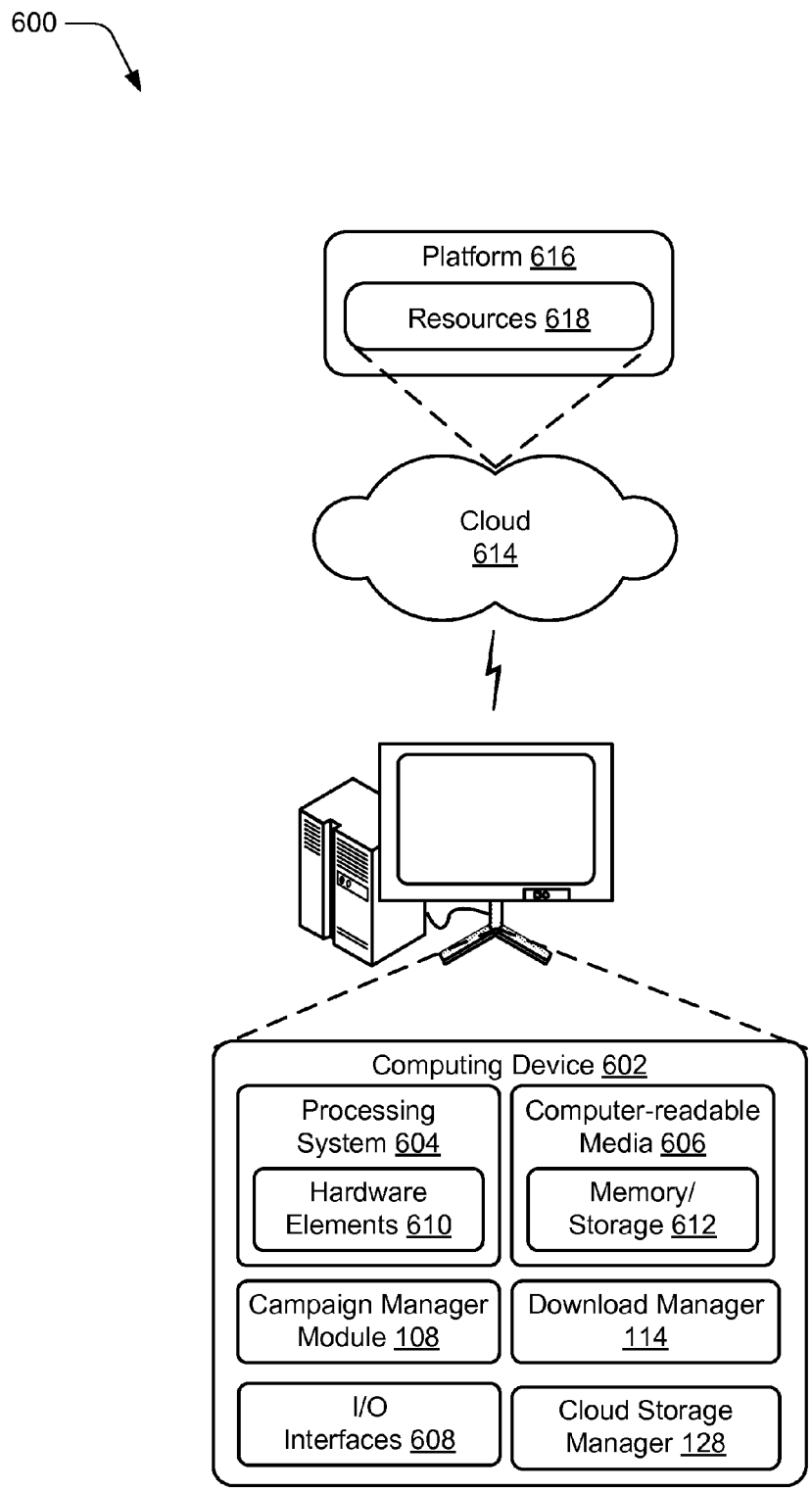
FIG. 6 illustrates an example system that includes an example computing device that is representative of one or more computing systems and/or devices that may implement the various techniques described herein.

Functionality of download manager 114 and cloud storage manager 128 may be implemented in a distributed environment, remotely via communication network 120 (e.g., "over the cloud") as further described in relation to FIG. 6, and so on. Although network 120 is illustrated as the Internet, the network may assume a wide variety of configurations. For example, network 120 may include a wide area network (WAN), a local area network (LAN), a wireless network, a public telephone network, an intranet, and so on. Further, although a single network 120 is shown, network 120 may also be configured to include multiple networks.

Figure 2:
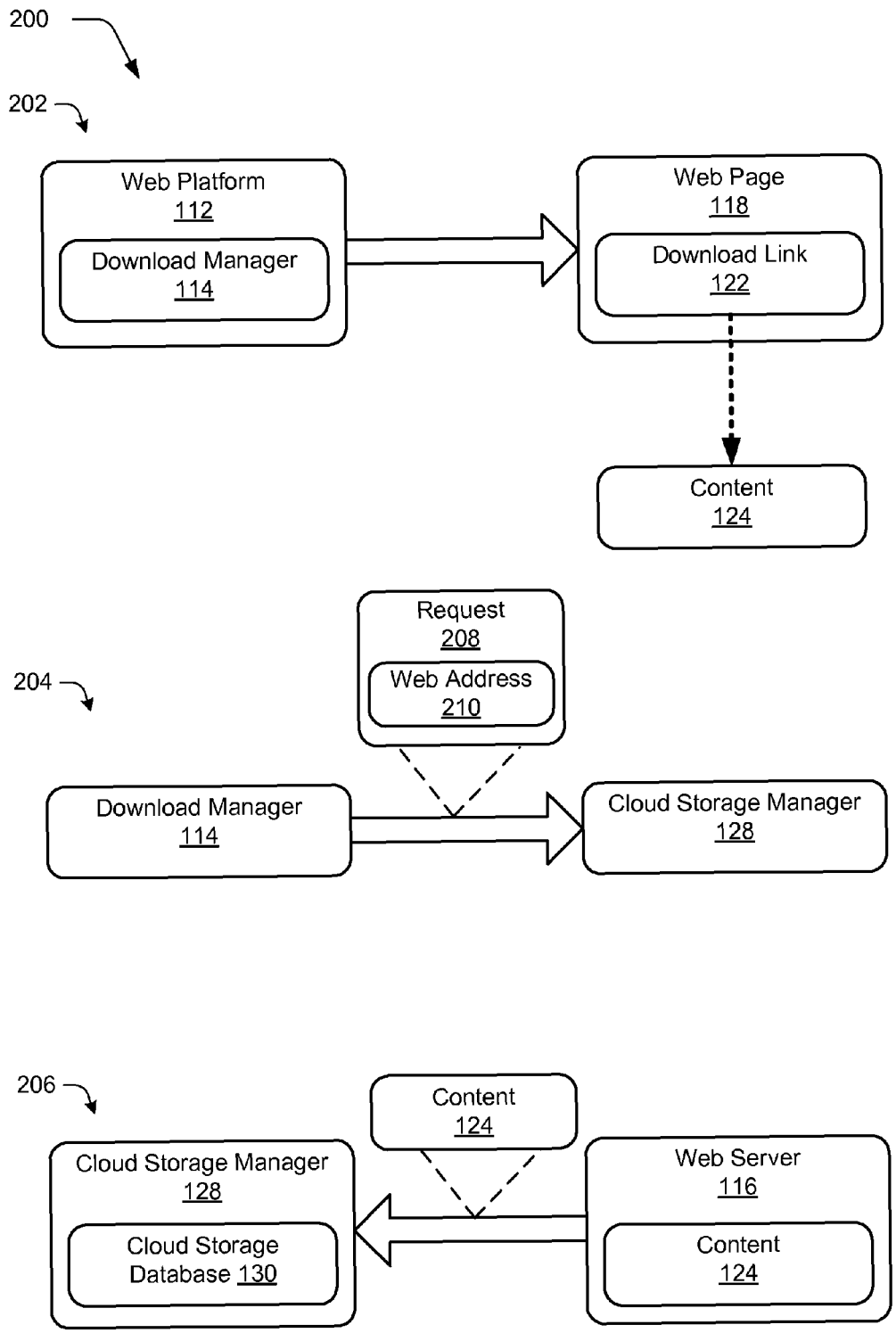
FIG. 2 illustrates a system in which a download manager initiates the download of content requested via user interaction with a web page to a cloud storage database in accordance with one or more implementations.

FIG. 2 illustrates a system 200 in which a download manager initiates the download of content requested via user interaction with a web page to a cloud storage database in accordance with one or more implementations. System 200 is illustrated through the use of first, second, and third stages 202, 204, and 206, respectively.

At first stage 202, web platform 112 implemented at computing device 102 is utilized to navigate to web page 118. Download manager 114 detects user input to web page 118, via web platform 112, to download content to computing device 102. The user input may corresponds to any type of user interaction with the web page, such as by selecting a link or control contained within the web page itself. In one or more implementations, the user input corresponds to selection of download link 122 contained within web page 118.

Figure 3:
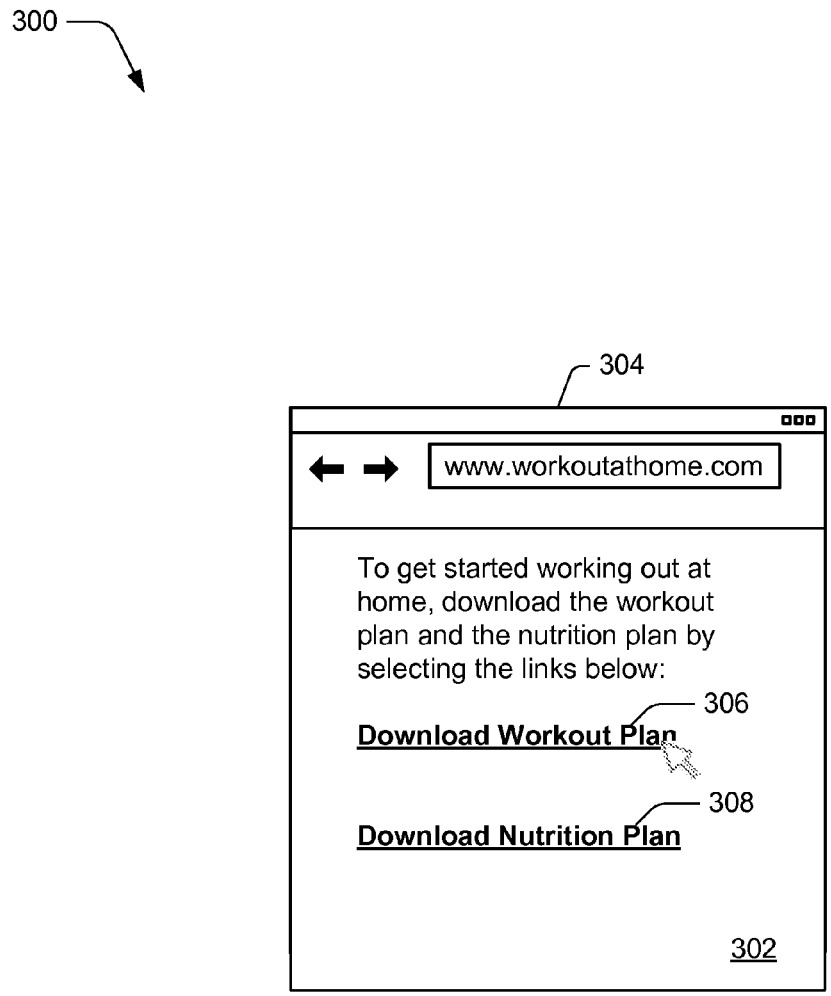
FIG. 3 illustrates an example of a user selection of a download link contained within a web page.

As an example, consider FIG. 3, which illustrates an example 300 of a user selection of a download link contained within a web page. In this example, a user has navigated to a web page 302 at the URL "www.workoutathome.com" using a web browser 304.

Web page 302 includes download links 306 and 308 to download content, which in this case corresponds to a "Workout Plan" and a "Nutrition Plan". The workout plan and the nutrition plan may be document files, such as word processing documents, PDF's, and so forth.

In this example, the user has selected download link 306 to download the workout plan by positioning a cursor over download link 306 and clicking. Of course, other ways to select a download link are contemplated, such as by touching the link, double tapping the link, selecting the link from a drop down list, and so forth.

As described herein, user interaction with web page 118 can be distinguished from user interaction with web platform 112. For example, in FIG. 3, web browser 304 has a control area 310 where various controls (e.g., an address bar, a back button, a forward button, or a refresh button), widgets, plug-in, and the like may be represented. Interactions with control area 310 of web browser 304, however, is not the same as interactions with web page 302 displayed in web browser 304.

Conventionally, user input to a web page to download content causes the web browser to initiate the download of the content to the computing device from which the user input is received. For example, selection of download link 306 contained in web page 302 would cause a conventional web browser to initiate the download of the content directly to the current computing device. As described above, however, storage space is often limited, especially when the computing device is implemented as a wireless phone or other storage-limited device.

Rather than initiating the download of content 124 to the file system of computing device 102, at second stage 204, download manager 114 automatically initiates a download of content 124 to cloud storage database 130. In one or more implementations, to initiate the download of content 124, download manager 114 automatically communicates a request 208 to download the content 124 associated with download link 122 to cloud storage manager 128. Download manager 114 is configured to automatically communicate the request without receiving any additional user input. For example, other than selection of download link 122, the user does not need to perform any other action, such as interacting with a special widget or control, in order to initiate the download of the content to the cloud storage database.

Request 208 may include a web address 210 (e.g., a URL) of content 124 that may be extracted from downlink link 122. In one or more implementations, request 208 is a "bind context" which includes web address 210 as well as various credentials that are needed to gain access to download content 124. Without such credentials integrated into request 208, the download may be counted as a "double download" by the web page. For example, some web pages only allow a set number of downloads (e.g., a web page may allow 5 downloads of a particular PDF that was purchased). Thus, the described techniques get around this limitation by including credentials with the request, which enables the download to cloud storage database 130 to be counted as a single download.

Download manager 114 is configured to communicate the request to cause cloud storage manager 128 to download content 124 to the cloud storage database 130 directly from web server 116 that hosts content 124.

Accordingly, at third stage 206, in response to receiving request 208 from download manager 114, cloud storage manager 128 extracts web address 210 of content 124 from request 208, and determines the web server 116 that hosts content 124 based on web address 210. For example, cloud storage manager 128 can determine the location of web server 116 based on the web address 210 of content 124 included in request 208.

Next, cloud storage manager 128 downloads content 124 from web server 116 and stores the content in cloud storage database 130. Cloud storage manager 128 facilitates the download of content 124 from web server 116 directly to cloud storage database 130 without storing the content in a file system of computing device 102. Notably, therefore, the exchange of content 124 is "server-to-server" and thus may be substantially quicker than downloading content 124 from web server 116 to the file system of computing device 102.

Cloud storage manager 128 may associate the content 124 stored in cloud storage database 130 with a user account of the user of computing device 102 to enable the user to access content 124 from one or more other computing devices that are associated with the user account.

In one or more implementations, cloud storage manager 128 communicates a notification to download manager 114 when the download of content 124 to cloud storage database 130 is complete. In response to receiving this notification, download manager 114 may notify the user, such as by displaying a notification on the display of computing device 102 that indicates that the download is complete. In some cases, this notification may be displayed in an "action center" along with other notifications. The user can then select the notification in order to access content 124 from cloud storage database 130.

Download manager 114 can initiate the download of content 124 to cloud storage database 130 based on a variety of different factors. In one or more implementations, download manager 114 is configured to initiate the download by communicating request 208 responsive to web platform 112 attempting and failing to render download link 122 in the web platform. For example, when the user input is received, web platform 112 attempts to render content 124 associated with download link 122. If content 124 is an HTML file type, for instance, the rendering engine of web platform 112 may render the HTML file in the web platform. Web platform 112 may be able to handle other types of files as well, such as .aspx files, .PDF files, and so forth. However, if content 124 corresponds to a file type that web platform 112 is unable to handle, then download link 122 is passed to download manager 114 causing the download manager to communicate request 208 to cloud storage manager 128.

In one or more implementations, download manager 114 can determine the context of the user input, and initiate the download of content 124 to cloud storage database 130 responsive to determining that the context of the user input is to download content. For example, user input to download and store content 124 can be distinguished from user input to execute content on content device 102.

Example Methods

The methods described herein are shown as sets of blocks that specify operations performed but are not necessarily limited to the order or combinations shown for performing the operations by the respective blocks. The techniques are not limited to performance by one entity or multiple entities operating on one device.

Figure 4:
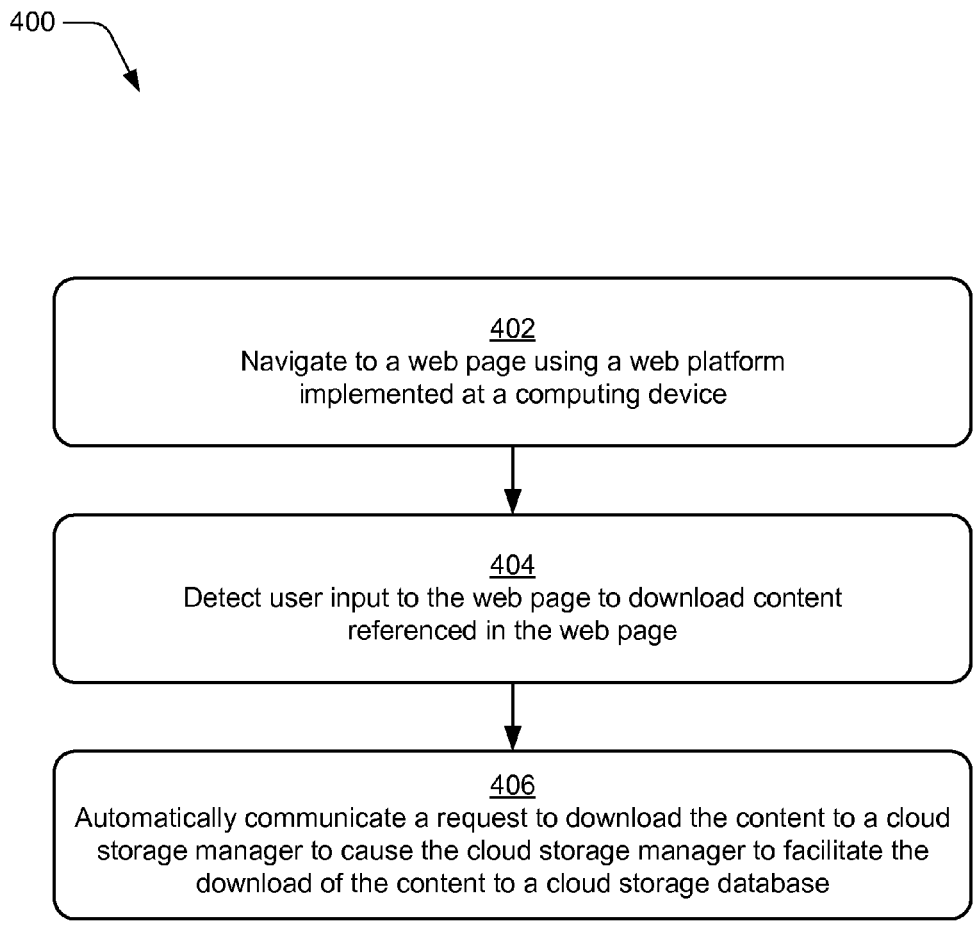
FIG. 4 illustrates an example method of initiating a download of content to a cloud storage database in response to detecting user input to a web page in accordance with one or more implementations.

FIG. 4 illustrates an example method 400 of initiating a download of content to a cloud storage database in response to detecting user input to a web page in accordance with one or more implementations.

At 402, a web page is navigated to using a web platform implemented at a computing device. For example, web page 118 is navigated to using web platform 112 implemented at computing device 102.

At 404, user input to the webpage to download content referenced in the web page is detected. For example, download manager 114 detects user input to web page 118 to download content 124 referenced in web page 118. In one or more implementations, the user input may correspond to a user selection of download link 122.

At 406, a request to download the content is automatically communicated to a cloud storage manager to cause the cloud storage manager to facilitate the download of the content to a cloud storage database that is remote from the computing device. For example, download manager 114 communicates request 208 to cloud storage manager 128 to cause cloud storage manager 128 to facilitate the download of content 124 to cloud storage database 130.

Figure 5:
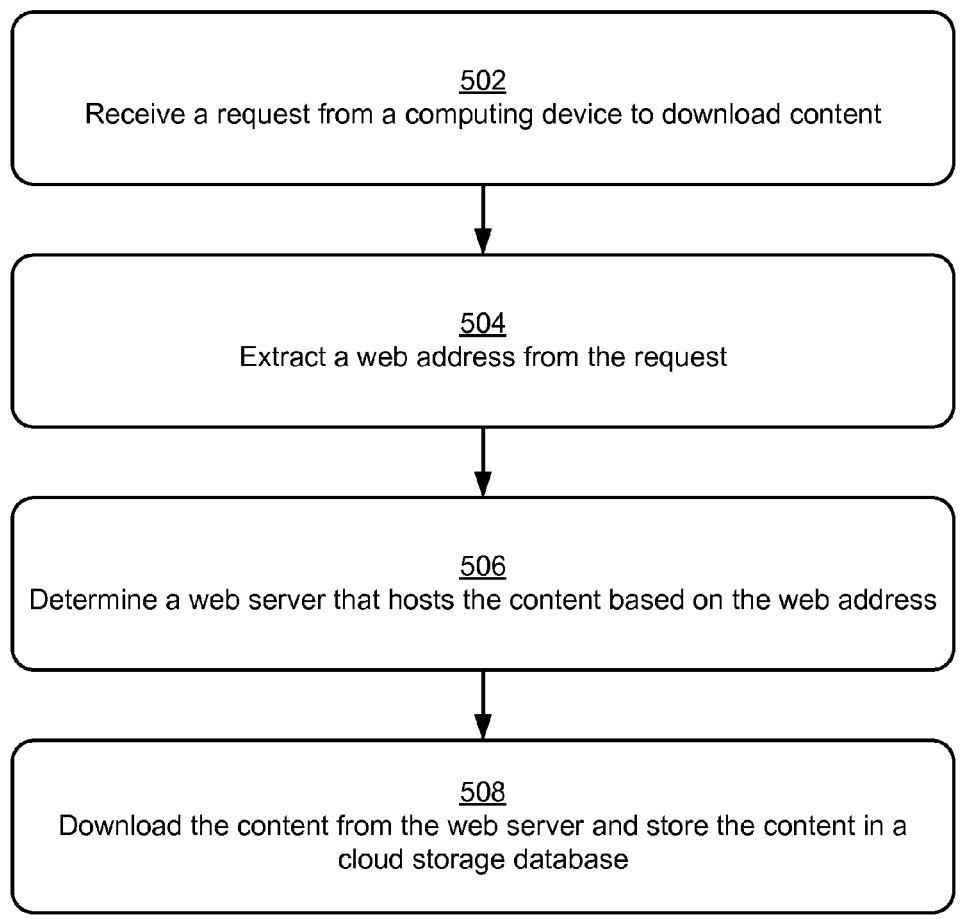
FIG. 5 illustrates an example method of facilitating the download of content to a cloud storage database in accordance with one or more implementations.

FIG. 5 illustrates an example method 500 of facilitating the download of content to a cloud storage database in accordance with one or more implementations.

At 502, a request to download content is received from a computing device. For example, cloud storage manager 128 receives request 208 to download content 124 from download manager 114 implemented at computing device 102. The request may be communicated from download manager 114 to cloud storage manager 128 responsive to user selection of download link 122 contained within a web page 118 rendered by web platform 112 implemented at computing device 102.

At 504, a web address of the content is extracted from the request, and at 506 a web server that hosts the content is determined based on the web address. For example, cloud storage manager 128 extracts web address 210 from request 208, determines web server 116 that hosts content 124 based on the web address.

At 508, the content is downloaded from the web server and the content is stored in a cloud storage database. For example, cloud storage manager 128 facilitates the download of content 124 from web server 116, and stores content 124 in cloud storage database 130.

Example System and Device

FIG. 6 illustrates an example system generally at 600 that includes an example computing device 602 that is representative of one or more computing systems and/or devices that may implement the various techniques described herein. This is illustrated through inclusion of download manager 114 and cloud storage manager 128 which may be configured to implement download manager integration with a cloud storage platform techniques as previously described.

The computing device 602 may be, for example, a server of a service provider, a device associated with a client (e.g., a client device), an on-chip system, and/or any other suitable computing device or computing system. The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION AND EXAMPLE IMPLEMENTATIONS

Example implementations described herein include, but are not limited to, one or any combinations of one or more of the following examples:

A system implemented at a computing device to download content to a cloud storage database implemented remote from the computing device, the system comprising:

at least a memory and a processor to implement a web platform and a download manager; the web platform configured to navigate to a web page; and the download manager configured to: detect user input to the web page to download content referenced in the web page; and automatically initiate the download of the content to a cloud storage database that is remote from the computing device without downloading the content to a file system of the computing device.

A system as described above, wherein the download manager is configured to automatically initiate the download of the content without receiving any additional user input.

A system as described above, wherein the user input comprises a selection of a download link contained within the web page.

A system as described above, wherein the download manager is configured to automatically initiate the download of the content responsive to the web platform attempting and failing to render the download link in the web platform.

A system as described above, wherein the download manager is configured to initiate the download responsive to determining that the user input is intended to download the content rather than execute the content.

A system as described above, wherein the download manager is configured to initiate the download by communicating a request to download the content to a cloud storage manager to cause the cloud storage manager to download the content to the cloud storage database directly from a web server that hosts the content.

A system as described above, wherein the request is communicated over a communication network to the cloud storage manager that is implemented remote from the computing device.

A system as described above, wherein the request to download the content includes a web address corresponding to the location of the content at the web server.

A system as described above, wherein the web platform comprises a web browser.

A system as described above, wherein the computing device comprises a wireless phone.

A computer-implemented method comprising: navigating to a web page using a web platform implemented at a computing device; detecting user input to the web page to download content referenced in the web page; and automatically communicating a request to download the content to a cloud storage manager to cause the cloud storage manager to download the content to a cloud storage database that is remote from the computing device.

A computer-implemented method as described above, wherein the user input comprises a selection of a download link contained within the web page.

A computer-implemented method as described above, wherein the automatically communicating the request is performed responsive to the web platform attempting and failing to render the download link in the web platform.

A computer-implemented method as described above, wherein the automatically communicating the request causes the cloud storage manager to download the content to the cloud storage database directly from a web server that hosts the content.

A computer-implemented method as described above, wherein the content is downloaded from the web server that hosts the content directly to the cloud storage database without storing the content in a file system of the computing device.

A computer-implemented method as described above, wherein the request to download the content includes a web address corresponding to the location of the content at the web server.

A system comprising: a cloud storage database configured to store content; and at least a memory and a processor to implement a cloud storage manager, the cloud storage manager configured to: receive a request from a computing device to download content, the request communicated from the computing device to the cloud storage manager responsive to user interaction with a web page rendered by a web platform implemented at the computing device; extract a web address of the content from the request; determine a web server that hosts the content based on the web address; and download the content from the web server and store the content in the cloud storage database.

A system as described above, wherein the cloud storage manager is further configured to associate the content stored in the cloud storage database with a user account of the user of the computing device to enable the user to access the content from the computing device and from one or more other computing devices that are associated with the user account.

A system as described above, wherein the cloud storage manager is further configured to notify the computing device that the download is complete when content is downloaded to the remote storage database.

A system as described above, wherein the user interaction with the web page comprises user selection of a download link contained within the web page.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A system implemented at a computing device to download content to a cloud storage database implemented remote from the computing device, the system comprising:
   at least a memory and a processor to implement a web platform and a download manager;
   the web platform to navigate to a web page; and
   the download manager, responsive to execution by the processor, performs operations including:
   detecting a user input to the web page to download content referenced in the web page; and
   automatically initiating the download of the content to the cloud storage database without downloading the content to a file system of the computing device, the download manager configured to automatically initiate the download of the content responsive to the web platform attempting and failing to render a download link associated with the content in the web platform.

2. The system of claim 1, wherein the download manager is configured to automatically initiate the download of the content without receiving any additional user input.

3. The system of claim 1, wherein the user input comprises a selection of the download link, the download link contained within the web page.

4. The system of claim 1, wherein the download manager is configured to initiate the download by communicating a request to download the content to a cloud storage manager to cause the cloud storage manager to download the content to the cloud storage database directly from a web server that hosts the content.

5. The system of claim 4, wherein the request is communicated over a communication network to the cloud storage manager that is implemented remote from the computing device.

6. The system of claim 4, wherein the request to download the content includes a web address corresponding to the location of the content at the web server.

7. The system of claim 1, wherein the web platform comprises a web browser.

8. The system of claim 1, wherein the computing device comprises a wireless phone.

9. The system of claim 1, wherein the web platform attempting and failing to render the download link comprises the content corresponding to a file type that the web platform is unable to handle.

10. A computer-implemented method comprising:
navigating to a web page using a web platform implemented at a computing device;
detecting user input to the web page to download content referenced in the web page; and
automatically communicating a request to download the content to a cloud storage manager to cause the cloud storage manager to download the content to a cloud storage database that is remote from the computing device, the request to download the content communicated responsive to the web platform attempting and failing to render a download link associated with the content in the web platform.

11. The computer-implemented method of claim 10, wherein the user input comprises a selection of the download link.

12. The computer-implemented method of claim 10, wherein the automatically communicating the request causes the cloud storage manager to download the content to the cloud storage database directly from a web server that hosts the content.

13. The computer implemented method of claim 12, wherein the content is downloaded from the web server that hosts the content directly to the cloud storage database without storing the content in a file system of the computing device.

14. The computer-implemented method of claim 10, wherein the request to download the content includes a web address corresponding to the location of the content at the web server.

15. The computer-implemented method of claim 10, wherein the web platform attempting and failing to render the download link comprises the content corresponding to a file type that the web platform is unable to handle.

16. A system comprising:
a cloud storage database configured to store content; and
at least a memory and a processor to implement a cloud storage manager, the cloud storage manager to:
receive a request from a computing device to download content, the request communicated from the computing device to the cloud storage manager responsive to user interaction with a web page rendered by a web platform implemented at the computing device and further responsive to the web platform attempting and failing to render a download link associated with the content in the web platform;
extract a web address of the content from the request;
determine a web server that hosts the content based on the web address; and
download the content from the web server and store the content in the cloud storage database.

17. The system of claim 16, wherein the cloud storage manager is further configured to associate the content stored in the cloud storage database with a user account of the user of the computing device to enable the user to access the content from the computing device and from one or more other computing devices that are associated with the user account.

18. The system of claim 16, wherein the cloud storage manager is further configured to notify the computing device that the download is complete when content is downloaded to the remote storage database.

19. The system of claim 16, wherein the user interaction with the web page comprises user selection of the download link.

20. The system of claim 16, wherein the web platform attempting and failing to render the download link comprises the content corresponding to a file type that the web platform is unable to handle.

* * * * *